(12) United States Patent
Norgren et al.

(10) Patent No.: US 7,938,878 B2
(45) Date of Patent: May 10, 2011

(54) FINE GRAINED CEMENTED CARBIDE WITH REFINED STRUCTURE

(75) Inventors: Susanne Norgren, Huddinge (SE); Alexandra Kusoffsky, Lidingö (SE); Alistair Grearson, West Midlands (GB)

(73) Assignee: Sandvik Intellectual Property AB, Sandviken (SE)

( * ) Notice: Subject to any disclaimer, the term of this patent is extended or adjusted under 35 U.S.C. 154(b) by 388 days.

(21) Appl. No.: 12/129,963

(22) Filed: May 30, 2008

(65) Prior Publication Data

US 2008/0314200 A1 Dec. 25, 2008

(30) Foreign Application Priority Data

Jun. 1, 2007 (SE) .................................. 0701320
Jun. 15, 2007 (SE) .................................. 0701449

(51) Int. Cl.
  *C22C 9/08* (2006.01)
(52) U.S. Cl. .......................................... 75/240; 419/18
(58) Field of Classification Search .................... 75/240; 419/18
  See application file for complete search history.

(56) References Cited

U.S. PATENT DOCUMENTS

| | | | |
|---|---|---|---|
| 5,679,448 A | 10/1997 | Kawata | |
| 6,103,357 A | 8/2000 | Selinder et al. | |
| 6,214,287 B1 * | 4/2001 | Waldenstrom | 419/18 |
| 6,250,855 B1 | 6/2001 | Persson et al. | |
| 6,261,673 B1 | 7/2001 | Reineck et al. | |
| 6,273,930 B1 | 8/2001 | Waldenström | |
| 6,309,738 B1 | 10/2001 | Sakurai | |
| 6,342,291 B1 | 1/2002 | Jonsson et al. | |
| 6,413,293 B1 | 7/2002 | Grearson et al. | |
| 6,884,499 B2 | 4/2005 | Penich et al. | |
| 7,727,621 B2 | 6/2010 | Nordlöf et al. | |
| 2002/0051887 A1 | 5/2002 | Jonsson et al. | |
| 2005/0072269 A1 * | 4/2005 | Banerjee | 75/240 |
| 2006/0029511 A1 | 2/2006 | Gustafson et al. | |
| 2006/0286410 A1 | 12/2006 | Ahlgren et al. | |
| 2007/0154739 A1 | 7/2007 | Martensson et al. | |
| 2007/0292671 A1 | 12/2007 | Akesson et al. | |
| 2008/0276544 A1 * | 11/2008 | Hirose et al. | 51/307 |

FOREIGN PATENT DOCUMENTS

| | | |
|---|---|---|
| EP | 1 043 413 B1 | 10/2000 |
| EP | 043 413 A2 | 10/2000 |
| EP | 1 038 989 B1 | 6/2004 |
| EP | 1 470 879 A1 | 10/2004 |
| EP | 1 526 189 A1 | 4/2005 |
| EP | 1 676 939 A1 | 7/2006 |
| EP | 1 795 628 A1 | 6/2007 |
| EP | 1 798 308 A2 | 6/2007 |
| EP | 1 798 310 A2 | 6/2007 |
| EP | 1 803 830 | 7/2007 |
| EP | 1 500 713 | 8/2007 |
| EP | 1 347 076 B1 | 2/2008 |
| EP | 1 900 849 A1 | 3/2008 |
| JP | 10-324942 | 12/1998 |
| JP | 10-324943 | 12/1998 |
| JP | 11-152535 | 6/1999 |
| JP | 2004-315904 A | 11/2004 |
| JP | 2006-117974 * | 5/2006 |
| WO | 97/20082 | 5/1997 |
| WO | WO 97/20082 | 6/1997 |
| WO | WO 99/13120 | 3/1999 |
| WO | WO 2006/041366 A1 | 4/2006 |
| WO | WO 2006/043421 A1 | 4/2006 |
| WO | WO 2006/080888 A1 | 8/2006 |

OTHER PUBLICATIONS

European Search Report dated Nov. 13, 2008 issued in European Application No. 08 10 4014.9.
Office Action mailed Aug. 13, 2010, in U.S. Appl. No. 12/128,803.
Office Action mailed Oct. 27, 2010, in U.S. Appl. No. 12/128,803.
Office Action mailed Aug. 13, 2010, in U.S. Appl. No. 12/147,587.
Office Action mailed Aug. 13, 2010, in U.S. Appl. No. 12/126,195.
European Search Report dated Nov. 13, 2008, issued in EP 08 10 4014.
European Search Report dated Nov. 11, 2008, issued in EP 08 15 6044.
European Search Report dated Nov. 12, 2008, issued in EP 08 15 7076.
European Search Report dated Nov. 12, 2008, issued in EP 08 15 6057.
International Search Report dated Oct. 3, 2008, issued in PCT/SE2008/050777.
Swedish Office Action mailed Jul. 12, 2007, issued in 0701449-1.
Andersen et al., "Deposition, microstructure and mechanical and tribological properties of magnetron sputtered TiN/TiA1N multilayers," Surface and Coatings Technology, No. 123, 2000, pp. 219-226.
Hsieh et al., "Deposition and characterization of TiA1N and multi-layered TiN/TiA1N coatings using unbalanced magnetron sputtering," Surface and Coatings Technology, 108-109, 1998, pp. 132-137.

* cited by examiner

*Primary Examiner* — Roy King
*Assistant Examiner* — Ngoclan T Mai
(74) *Attorney, Agent, or Firm* — Drinker Biddle & Reath LLP

(57) ABSTRACT

The present invention relates to a fine grained WC-Co cemented carbide. By adding an extremely small amount of Ti, V, Zr, Ta or Nb alone or in combinations, a grain refined cemented carbide structure with less abnormal WC-grains has been obtained.

8 Claims, 1 Drawing Sheet

FINE GRAINED CEMENTED CARBIDE WITH REFINED STRUCTURE

BACKGROUND OF THE INVENTION

The present invention relates to a fine grained cemented carbide containing chromium. By adding small but well controlled amounts of Ti, Nb, V, Zr or Ta alone or in combinations, a further grain refined cemented carbide structure has been obtained without embrittling secondary phases.

Cemented carbide cutting tools with a grain refined structure are used today to a great extent for the machining of steel, hardened steel, stainless steels and heat resistant alloys in applications with high demands on both toughness and wear resistance. Another important application is in microdrills for the machining of printed circuit board, so-called PCB-drills. In these types of applications it is known that the amount and size of defects, such as abnormal WC-grains, small precipitates of embrittling phases, porosity, binder phase lakes, are critical for the mechanical properties, e.g. fracture toughness and transverse rupture strength (TRS).

Common grain growth inhibitors include vanadium, chromium, niobium, tantalum or compounds involving these. When added, generally as carbides and in an amount of from about 0.15 to about 1.5 wt-%, they limit grain growth during sintering, but they also have undesirable side effects, affecting the toughness behaviour in an unfavourable direction. Vanadium is known to be the most effective grain growth inhibitor but is also particularly detrimental due to its negative influence on the toughness properties. Normal levels of vanadium additions are also known to result in precipitation of embrittling phases in the WC/Co grain boundaries.

In order to achieve a fine, as sintered grain size of less than about 0.6 µm for cemented carbides with Cr/Co-ratios of from about 0.04 to about 0.06, very fine WC raw material is needed and the sintering is generally performed at a relatively low temperature, e.g. close to a temperature of about 1360° C. and often by sinterHIP or followed by hot isostatic pressing in order to obtain a dense structure. Such a production route of course increases the production cost, but also increases the risk of uneven binder phase distribution. In addition, the use of these very fine WC-raw materials gives powders with inferior compaction properties, resulting in powders that are difficult to compact to complicated geometries such as cutting inserts.

According to WO 99/13120, the amount of grain growth inhibitors can be reduced if a carbon content of the cemented carbide close to eta-phase formation is chosen.

JP-A-11-152535 discloses a process to manufacture fine grained tungsten carbonitride-cobalt hard alloys using tungsten carbonitride as a raw material. JP-A-10-324942 and JP-A-10-324943 disclose methods to produce fine grained cemented carbide by adding the grain growth inhibitors as nitrides. In order to avoid pore formation by denitrification of the nitrides sintering is performed in a nitrogen atmosphere.

EP-A-1500713 discloses a method of making a fine grained tungsten carbide-cobalt cemented carbide comprising mixing, milling according to standard practice followed by sintering. By introducing nitrogen at a pressure of more than 0.5 atm into the sintering atmosphere after dewaxing but before pore closure a grain refinement including reduced grain size and less abnormal grains can be obtained.

EP-A-1803830 discloses cemented carbides which include WC having an average particle diameter of <0.3 µm as a hard phase and 5.5 to 15 wt-% of at least one iron group metal element as a binder phase, and comprise, in addition to the above hard phase and binder phase, 0.005 to 0.06 wt-% of Ti, Cr in a weight ratio relative to the binder phase of 0.04 to 0.2. Especially, the above cemented carbides contain no Ta.

According to US 2006/029511, there is provided a method of making a fine grained tungsten carbide-cobalt cemented carbide comprising mixing, milling according to standard practice followed by sintering. By introducing nitrogen at a pressure of more than 0.5 atm into the sintering atmosphere after dewaxing but before pore closure a grain refinement including reduced grain size and less abnormal grains can be obtained.

OBJECTS AND SUMMARY OF THE INVENTION

It is an object of the present invention to avoid or alleviate the problems of the prior art.

It is further an object of the present invention to provide fine or submicron cemented carbide cutting tools with improved binder phase distribution and reduced amounts of abnormal WC grains giving cemented carbide tools with improved mechanical and cutting properties.

In one aspect of the invention, there is provided a WC-Co cemented carbide comprising a composition of from about 3 to about 15 wt-% Co and Cr such that the Cr/Co-ratio by weight is from about 0.05 to about 0.15 and balance WC and in addition ppm levels of one of the following additional elements V, Nb, Zr, Ta then with a grain size of WC of from about 0.1 to about 2.0 µm or mixtures of at least two of Ti, V, Nb, Zr, Ta, then with a grain size of WC of more than about 0.3 up to about 2.0 µm, the ratio of Me/Co=(at-% Ti+at-% V+at-% Nb+at-% Zr+at-% Ta)/at-% Co is lower than or equal to about 0.014-(CW_Cr)*0.008 and higher than about 0.0005, with a CW_Cr ratio of from about 0.79 to about 0.95, with CW_Cr=(magnetic-% Co+1.13*wt % Cr)/wt % Co where magnetic-% Co is the weight percentage of magnetic Co and wt-% Co is the weight percentage of Co in the cemented carbide.

In another aspect of the invention, there is provided a method of making a WC-Co cemented carbide as described in the preceding paragraph comprising mixing and wetmilling of powders of WC and Co, pressing and sintering wherein ppm levels of Ti, V, Nb, Zr or Ta or mixtures thereof, except Ti alone, as pure metals or as a carbides, nitrides and/or carbonitrides or mixtures thereof are added to the powder mixture.

DETAILED DESCRIPTION OF THE PREFERRED EMBODIMENTS

Figure 1:
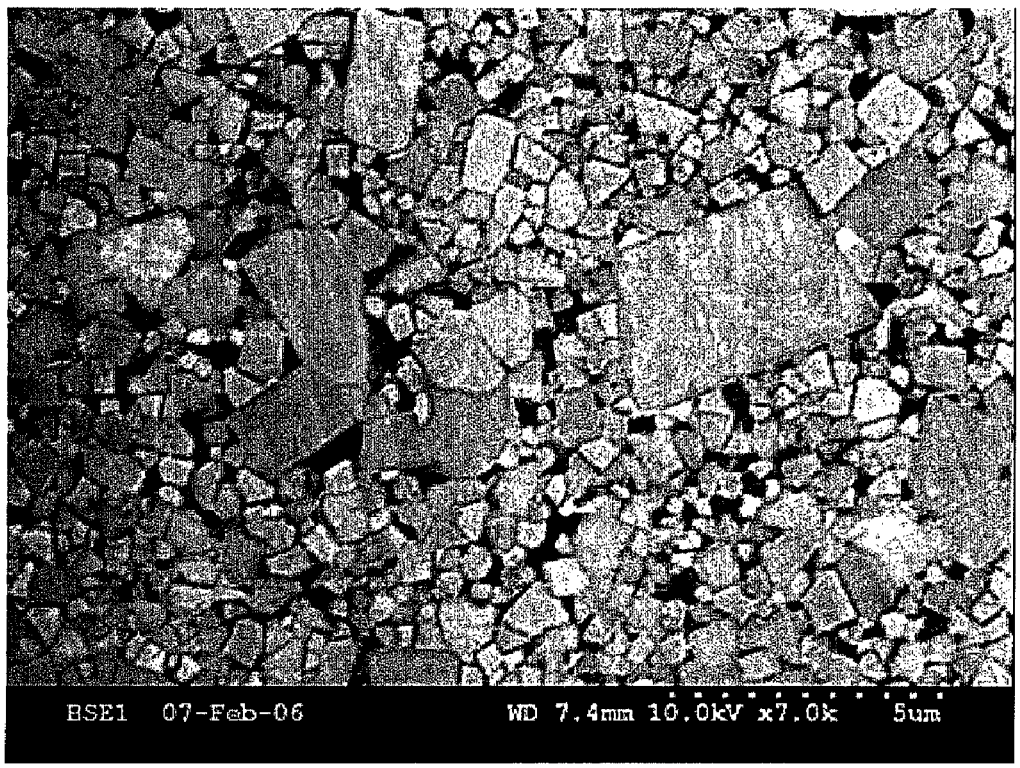
FIG. 1 shows a back scattered SEM micrograph of the microstructure of a cemented carbide according to prior art.

It has now surprisingly been found that a pronounced grain refining effect in combination with an improved binder phase distribution can be obtained by the introduction of one of V, Nb, Zr, Ta or mixtures of at least two of Ti, V, Nb, Zr, Ta, on ppm-level in a chromium containing cemented carbide. The present invention provides a material that can be sintered at about 1360° C. or higher maintaining the fine grain size and binder phase distribution despite that the higher Cr/Co-ratio decreases the melting temperature of the binder and, thus, gives a longer time in the liquid state during the sintering where grain growth is rapid. The present invention allows for the same grain size to be achieved also allowing for higher carbon balances applicable for CVD coating.

The cemented carbide body comprises tungsten carbide with from about 3 to about 15 wt-% Co and Cr such that the Cr/Co-ratio by weight is from about 0.05 to about 0.15 and balance WC. In addition to that ppm levels of:
  one of the following additional elements V, Nb, Zr, Ta then with a grain size of WC of from about 0.2 to about 2.0 μm, or
  mixtures of at least two of Ti, V, Nb, Zr, Ta, then with a grain size of WC of more than about 0.3 up to about 2.0 μm. The ratio of Me/Co=(at-% Ti+at-% V+at-% Nb+at-% Zr+at-% Ta)/at-% Co is lower than or equal to about 0.014-(CW_Cr)*0.008 and higher than about 0.0005, preferably higher than about 0.0007, with CW_Cr from about 0.79 to about 0.95, preferably from about 0.80 to about 0.92, where CW_Cr=(magnetic-% Co+1.13*wt % Cr)/wt-% Co where magnetic-% Co is the weight percentage of magnetic Co and wt-% Co is the weight percentage of Co in the cemented carbide. The CW_Cr is a function of the W content in the Co binder phase. A CW_Cr of about 1 corresponds to a very low W-content in the binder phase and a CW_Cr of 0.75-0.8 corresponds to a high W-content in the binder phase.

The sintered body may also contain small amounts of precipitations of further additional phase or phases such as eta-phase, MX or $M_7X_3$, $M_3X_2$ where M=(V+Zr+Ti+Ta+Nb+Co+Cr+W) and X=C or N may be allowed to a volume fraction of maximum 0.5 vol % without detrimental effects.

In one embodiment, the further additional element is Zr alone or in combination with one or more of the aforesaid additional elements.

In another embodiment, the further additional elements are Zr and Ti.

In yet another embodiment, the further additional elements are Ta and Ti.

In another embodiment, the cemented carbide contains from about 0.01 to about 0.10 wt-% N.

In yet another embodiment, the further additional element(s) is a mixture of Ti and Ta, having a N-content of more than about 0.02 wt-%, preferably more than about 0.03 wt-% but less than about 0.1 wt-%.

The method of making the cemented carbide according to the present invention with a composition according to above comprises mixing, milling, pressing and sintering of submicron tungsten carbide-cobalt bodies according to standard practice. Ppm levels of Ti, V, Nb, Zr or Ta or mixtures thereof, except Ti alone, are added as pure metals or as carbides, nitrides and/or carbonitrides or mixtures thereof in such amounts that the Me/Co and CW values according to above are fulfilled in the sintered cemented carbide.

The invention is additionally illustrated in connection with the following examples, which are to be considered as illustrative of the present invention. It should be understood, however, that the invention is not limited to the specific details of the examples.

EXAMPLE 1

Cemented carbide mixtures 1A-1K with the compositions in wt-% according to table 1a and WC as rest were prepared. The WC-powder had an FSSS grain size of 0.8 μm as supplied from H.C. Starck and fine grain (0.5 μm) cobalt from Umicore and H.C. Starck fine grain $Cr_3C_2$, TiC, VC, ZrC, TaC and NbC:

TABLE 1a

| Variant | Co | Cr | Ti | V | Zr | Ta | Nb | |
|---|---|---|---|---|---|---|---|---|
| 1A | 7 | 0.8 | — | — | — | — | — | comp |
| 1B | 7 | 0.8 | 0.023 | — | 0.01 | — | — | inv |
| 1C | 7 | 0.8 | 0.032 | — | 0.005 | — | — | inv |
| 1D | 7 | 0.8 | — | 0.024 | 0.01 | 0.014 | — | inv |
| 1E | 7 | 0.8 | — | 0.034 | 0.005 | — | — | inv |
| 1F | 7 | 1.0 | 0.023 | 0.012 | 0.005 | — | — | inv |
| 1G | 7 | 0.7 | 0.014 | — | — | 0.010 | — | inv |
| 1H | 7 | 0.9 | — | — | 0.020 | 0.01 | — | inv |
| 1I | 9.25 | 1.2 | — | — | — | 0.013 | 0.0072 | inv |
| 1J | 9 | 0.9 | 0.023 | — | — | 0.014 | — | inv |
| 1K | 9 | 0.36 | — | — | — | — | — | ref |

The mixtures were wet milled, dried, compacted and sintered to bodies at 1360 and 1410° C., respectively, in a protective atmosphere of Ar at a pressure of 40 mbar for 1 h. After sintering CW_Cr and 0.014-(CW_Cr)*0.008 for the two sintering temperatures were determined and reported in table 1b together with the Me/Co.

TABLE 1b

| | | Sintering temp. ° C. | | | |
|---|---|---|---|---|---|
| | | 1410 | | 1360 | 1360 |
| | | 1410 | 0.014 − | 1360 | 0.014 − |
| | Me/Co | CW_Cr | (CW_Cr) * 0.008 | CW_Cr | (CW_Cr) * 0.008 |
| 1A | NA | 0.94 | NA | 0.90 | NA |
| 1B | 0.00491 | 0.96 | 0.00633 | 0.92 | 0.00663 |
| 1C | 0.00609 | 0.94 | 0.00649 | 0.91 | 0.00671 |
| 1D | 0.00546 | 0.90 | 0.00681 | 0.94 | 0.00647 |
| 1E | 0.00600 | 0.89 | 0.00689 | 0.93 | 0.00655 |
| 1F | 0.00645 | 0.88 | 0.00697 | 0.86 | 0.00709 |
| 1G | 0.00258 | 0.85 | 0.00718 | 0.83 | 0.00736 |
| 1H | 0.00228 | 0.76 | 0.00790 | 0.77 | 0.00786 |
| 1I | 0.00094 | 0.95 | 0.00643 | 0.88 | 0.00697 |
| 1J | 0.00228 | 0.85 | 0.00718 | 0.85 | 0.00718 |
| 1K | NA | 0.90 | NA | 0.87 | NA |

NA = not applicable

In table 1c the as sintered grain size is given for the sintering temperatures 1410 and 1360° C. The sintered grain size was determined from hardness (Hv30) and coercivity measurements.

TABLE 1c

| Variant | 1A | 1B | 1C | 1D | 1E | 1F | 1G | 1H | 1I | 1J | 1K |
|---|---|---|---|---|---|---|---|---|---|---|---|
| | | | | Sintered at 1410° C. | | | | | | | |
| Dwc, μm | 0.90 | 0.77 | 0.74 | 0.82 | 0.82 | 0.77 | 0.80 | 0.82 | 0.61 | 0.70 | 0.96 |
| | | | | Sintered at 1360° C. | | | | | | | |
| Dwc, μm | 0.82 | 0.70 | 0.70 | 0.79 | 0.78 | 0.75 | 0.76 | 0.77 | 0.59 | 0.64 | 0.88 |

The surprising effect of low additions cubic carbide formers is clearly demonstrated at two different sintering temperatures.

EXAMPLE 2

Cemented carbide mixtures 2A, 2B and 2C with compositions given in Table 2a were prepared. The WC-powder had an FSSS grain size of 0.9 μm with a N-content of 0.04 wt-% and fine grain (0.5 μm) cobalt from Umicore and H.C. Starck fine grain $Cr_3C_2$, ZrC and VC.

TABLE 2a

Chemical composition given in wt-%, 8 wt-% Co and rest = WC.

|    | Cr   | V      | Zr    | N     | CW_Cr | Me/Co  | 0.014 − (CW_Cr) * 0.008 |     |
|----|------|--------|-------|-------|-------|--------|-------------------------|-----|
| 2A | 0.51 | —      | 0.025 | 0.032 | 0.76  | 0.0020 | 0.0079                  | Inv |
| 2B | 0.51 | 0.0266 | —     | 0.032 | 0.78  | 0.0038 | 0.0078                  | Inv |
| 2C | 0.51 | —      | —     | 0.032 | 0.69  | NA     | NA                      | Ref |

NA = not applicable

The powders were mixed by milling for 8 hours in a ball mill, thereafter pressed and sintered to bodies at 1410° C. for 1 hour in a protective atmosphere of Ar at a pressure of 40 mbar. After sintering the CW_Cr and Hc were measured. CW_Cr and 0.014-(CW_Cr)*0.008 were determined and also reported in table 2a together with the Me/Co.

Furthermore the bodies were cut and crossections were ground and thereafter polished. Ten micrographs in suitable magnification for grain size measurement were taken of each sample corresponding to the area given in table 2b. The grain size was measured using Jefferies planimetric method by the equivalent circle method.

TABLE 2b

Figure 2:
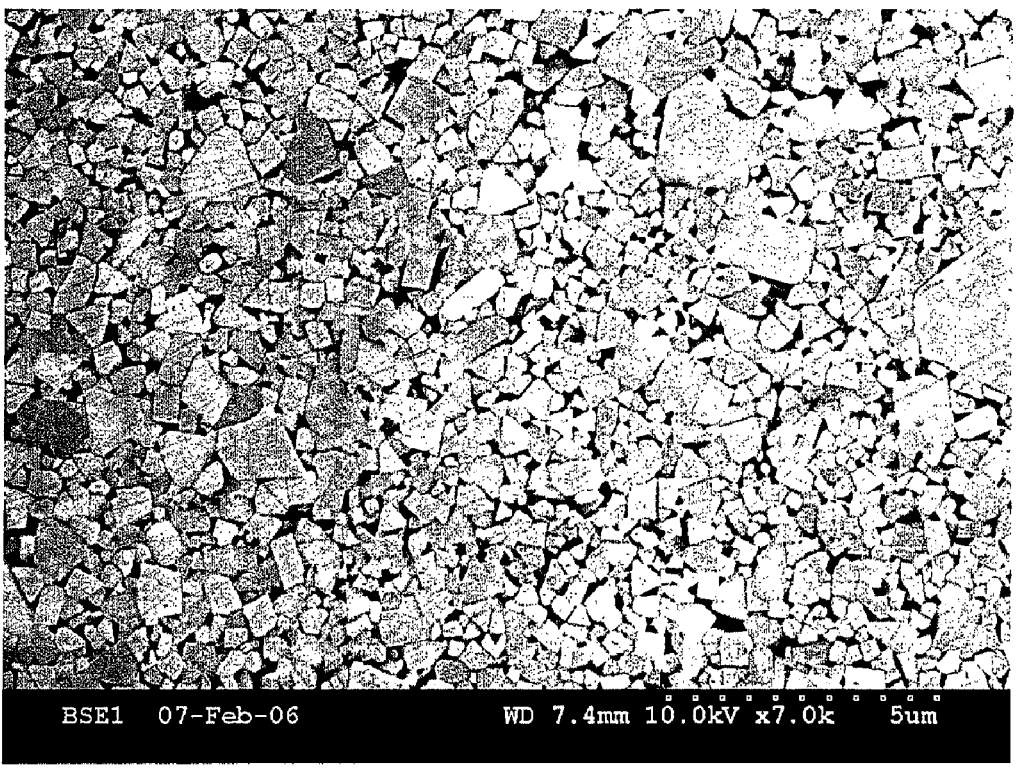
FIG. 2 shows a back scattered SEM micrograph of the microstructure of a cemented carbide according to the invention.

|    | No. of grains | Area μm2 | grains/Area | 2r (μm) |        |
|----|---------------|----------|-------------|---------|--------|
| 2A | 5430          | 469.00   | 11.58       | 0.31    | FIG. 2 |
| 2B | 6070          | 732.80   | 8.28        | 0.36    |        |
| 2C | 5980          | 1235.0   | 4.84        | 0.47    | FIG. 1 |

Adding ppm-levels of Zr and V has a strong grain refining effect.

EXAMPLE 3

Cemented carbide mixtures 3A, 3B and 3C with the compositions according to table 3a were prepared. The WC-powder had an FSSS grain size of 0.9 μm as supplied from H.C. Starck and fine grain (0.5 μm) cobalt from Umicore and H.C. Starck fine grain Cr3C2, TiC and ZrC.

TABLE 3a

Chemical composition given in wt-%

| Variant | Co | Cr   | Zr    | Ti %  | WC   |            |
|---------|----|------|-------|-------|------|------------|
| 3A      | 10 | 0.43 | —     | —     | Rest | Reference  |
| 3B      | 10 | 1.0  | 0.012 | 0.014 | Rest | Invention  |
| 3C      | 10 | 0.6  | 0.06  | —     | Rest | Invention  |

The powders were mixed by milling for 8 hours in a ball mill, thereafter pressed and sintered to bodies at 1410° C. for 1 hour in a protective atmosphere of Ar at a pressure of 40 mbar. After sintering the CW_Cr and Hc were measured. CW_Cr and 0.014-(CW_Cr)*0.008 were determined and are also reported in table 3b together with the Me/Co.

TABLE 3b

| Variant | CW_Cr | Me/Co  | 0.014 − (CW_Cr) * 0.008 |           |
|---------|-------|--------|-------------------------|-----------|
| 3A      | 0.90  | —      | NA                      | Ref       |
| 3B      | 0.92  | 0.0025 | 0.0066                  | Invention |
| 3C      | 0.90  | 0.0039 | 0.0068                  | Invention |

NA = not applicable

Sintered bodies of each variant were cut in half, ground and polished and thereafter etched with Murakami's regent for 2 minutes. An area of corresponding to 1 $cm^2$ of each variant was examined by light optical microscopy and grains with a maximum length in any direction larger than or equal to 5 μm were counted. The result is given in table 3c:

TABLE 3c

Number of grains with max. length >= 5 μm

| Variant | No of grains |           |
|---------|--------------|-----------|
| 3A      | 76           | Reference |
| 3B      | 5            | Invention |
| 3C      | 17           | Invention |

The Zr and Zr+Ti ppm-levels reduces the amount of abnormal grains by more than 50%.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:
1. WC-Co cemented carbide comprising a composition of from about 3 to about 15 wt-% Co and Cr such that the Cr/Co-ratio by weight is from about 0.05 to about 0.15, from about 0.01 to about 0.10 wt-% N, and balance WC and in addition ppm levels of:
one of the following additional elements V, Nb, Zr, Ta then with a grain size of WC of from about 0.1 to about 2.0 μm
or
mixtures of at least two of Ti, V, Nb, Zr, Ta, then with a grain size of the WC of more than about 0.3 up to about 2.0 μm,
the ratio of

Me/Co=(at-% Ti+at-% V+at-% Nb+at-% Zr+at-% Ta)/at-% Co is lower than or equal to about 0.014-(CW_Cr)*0.008 and higher than about 0.0005, with a CW_Cr ratio of from about 0.79 to about 0.95, with CW_Cr=(magnetic-% Co+1.13*wt % Cr)/wt % Co where magnetic-% Co is the weight percentage of magnetic Co and wt-% Co is the weight percentage of Co in the cemented carbide.

2. Cemented carbide of claim 1 wherein one of the said additional elements is Zr.

3. Cemented carbide of claim 1 wherein said additional elements are Zr and Ti.

4. Cemented carbide of claim 1 wherein said additional elements are Ti and Ta.

5. Cemented carbide of claim 1 wherein said additional elements are Ti and Ta with a N-content of more than about 0.02 wt-%.

6. Cemented carbide of claim 1 wherein the ratio Me/Co is higher than about 0.0007.

7. Cemented carbide of claim 1 wherein the CW_Cr is from about 0.80 to about 0.92.

8. Method of making a WC-Co cemented carbide according to claim 1 comprising mixing and wetmilling of powders of WC and Co, pressing and sintering wherein ppm levels of one of the following additional elements V, Nb, Zr, Ta or mixtures of at least two of Ti, V, Nb, Zr, Ta, as pure metals or as a carbides, nitrides and/or carbonitrides or mixtures thereof are added to the powder mixture.

* * * * *